March 23, 1954 W. ERNST 2,672,836

BLANKHOLDER ARRANGEMENT FOR PRESSES

Filed Sept. 15, 1949

11 Sheets-Sheet 1

INVENTOR
WALTER ERNST
BY Toulmin & Toulmin
ATTORNEYS

March 23, 1954 W. ERNST 2,672,836

BLANKHOLDER ARRANGEMENT FOR PRESSES

Filed Sept. 15, 1949 11 Sheets-Sheet 2

INVENTOR
WALTER ERNST
BY Toulmin & Toulmin
ATTORNEYS

March 23, 1954 W. ERNST 2,672,836

BLANKHOLDER ARRANGEMENT FOR PRESSES

Filed Sept. 15, 1949

11 Sheets-Sheet 3

INVENTOR
WALTER ERNST
BY Toulmin & Toulmin
ATTORNEYS

March 23, 1954 W. ERNST 2,672,836

BLANKHOLDER ARRANGEMENT FOR PRESSES

Filed Sept. 15, 1949 11 Sheets-Sheet 4

INVENTOR
WALTER ERNST
BY
Toulmin & Toulmin
ATTORNEYS

March 23, 1954 W. ERNST 2,672,836

BLANKHOLDER ARRANGEMENT FOR PRESSES

Filed Sept. 15, 1949 11 Sheets-Sheet 5

INVENTOR
WALTER ERNST
BY
Toulmin & Toulmin
ATTORNEYS

BLANKHOLDER ARRANGEMENT FOR PRESSES

Filed Sept. 15, 1949

11 Sheets-Sheet 6

INVENTOR
BY WALTER ERNST
Toulmin & Toulmin
ATTORNEYS

BLANKHOLDER ARRANGEMENT FOR PRESSES

Filed Sept. 15, 1949 11 Sheets-Sheet 7

INVENTOR
WALTER ERNST
BY Toulmin & Toulmin
ATTORNEYS

March 23, 1954 W. ERNST 2,672,836

BLANKHOLDER ARRANGEMENT FOR PRESSES

Filed Sept. 15, 1949 11 Sheets-Sheet 8

INVENTOR
BY WALTER ERNST
Toulmin & Toulmin
ATTORNEYS

INVENTOR
WALTER ERNST
BY Toulmin & Toulmin
ATTORNEYS

March 23, 1954 W. ERNST 2,672,836

BLANKHOLDER ARRANGEMENT FOR PRESSES

Filed Sept. 15, 1949 11 Sheets-Sheet 10

INVENTOR
WALTER ERNST
BY
Toulmin & Toulmin
ATTORNEYS

March 23, 1954 W. ERNST 2,672,836

BLANKHOLDER ARRANGEMENT FOR PRESSES

Filed Sept. 15, 1949 11 Sheets-Sheet 11

INVENTOR
WALTER ERNST
By Toulmin & Toulmin
ATTORNEYS

Patented Mar. 23, 1954 2,672,836

UNITED STATES PATENT OFFICE 2,672,836

BLANKHOLDER ARRANGEMENT FOR PRESSES

Walter Ernst, Dayton, Ohio, assignor to The Commonwealth Engineering Company of Ohio, Dayton, Ohio, a corporation of Ohio Application September 15, 1949, Serial No. 115,901

6 Claims. (Cl. 113—45)

This application relates to presses and particularly to hydraulic presses, and more particularly still to blankholder arrangements for presses.

One of the primary objects of this invention is the provision of a press construction better adapted to modern technology than presses constructed according to the prior art, in that the press is easier to manufacture and to modify, and is relatively simple to service and repair.

Presses. of the general type with which this invention is concerned are well known in the art, but heretofore almost every press manufactured was especially designed for a particular job or for a particular class of work. This procedure not only involved expenditure of a great deal of designing time, but also, in most instances, required the making of new patterns and the like for each job to be built.

For example, while ordinary single acting presses were fairly well standardized, a double or triple acting press was usually constructed with the die cushion and blank holder integrally built into the press. If a press of this type was later converted to straight pressing work, the die cushion and blank holder was generally surplusage and represented an investment on which no return was to be had.

Accordingly, one of the particular objects of this invention is to arrive at a standard basic press design which can be modified with very little effort in order to convert it into a double or triple acting press, if so desired. Similarly, if a press constructed according to this invention is double or triple acting, it can readily be converted to a standard press arrangement.

Another object of this invention is the provision of an improved and simplified blank holder arrangement which can readily be put on the press or removed therefrom.

It is also an object to provide a blank holder actuating arrangement which does not detract from the pressing force applied to the press platen.

A still further object is the provision of actuating systems for the blank holder and die cushion referred to above which require the minimum of piping on the press.

A still further object of this invention is to provide a blank holder arrangement in which the blank holder load is not imposed on the press frame, whereby the addition of the blank holder arrangement to a press structure does not require the making of a heavier press frame.

These and other objects and advantages will become more apparent upon reference to the following description taken in connection with the accompanying drawings in which.

Figure 1:
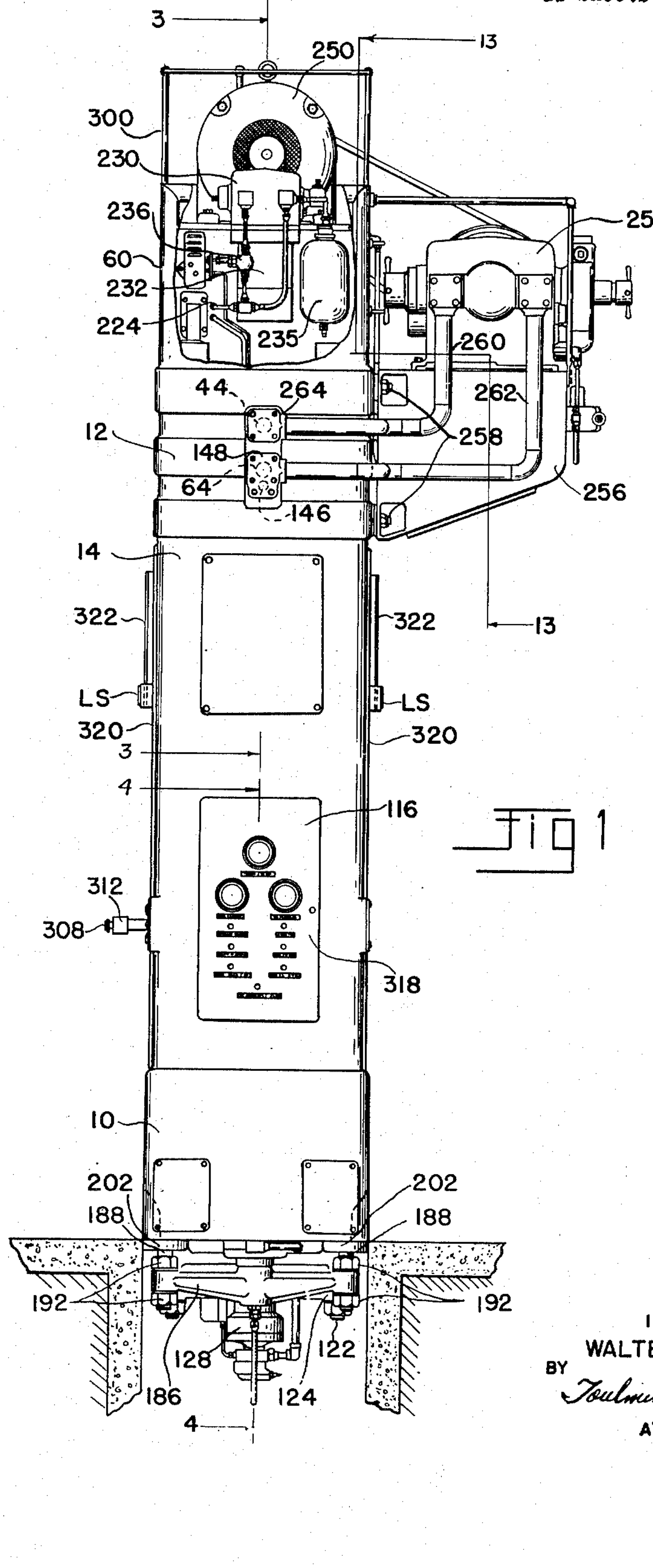
Figure 1 is a side elevational view of a press constructed according to my invention and with a part of the reservoir on the top of the press broken away to show the arrangement of the operating units therein.
Figure 2:
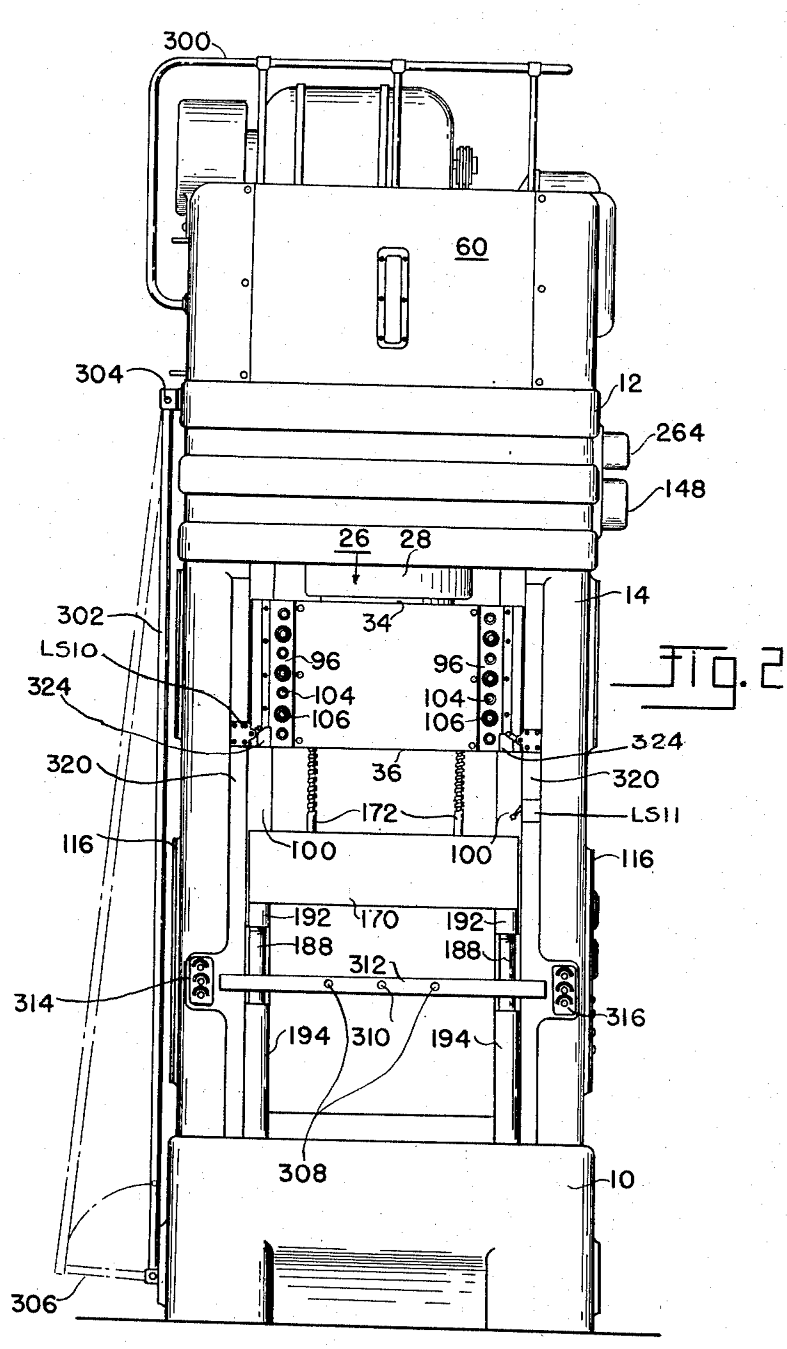
Figure 2 is a front elevational view of the press.

Referring to the drawings somewhat more in detail, and particularly to Figures 1 through 4, a press constructed according to my invention comprises the usual bed 10 and head 12 spaced apart by the press uprights 14. Uprights 14 enclose strain rods 16, which extend through the corners of the head and bed and preferably act as keys for maintaining the head, bed, and uprights in rigid alignment by means of the enlarged diameter portions 18 which fit into machined bores where the head and uprights meet and also where the uprights and bed meet.

Suitable nuts, as at 20, are threaded onto the ends of the strain rods for holding the head and bed in rigid assembled relationship with said uprights.

According to this invention, the press head and cylinder mounted therein are separate castings. This is a preferred practice because the cylinder can be of the exact size required to do the work which is to be placed in the press, and in this manner full advantage can be taken of the available hydraulic horsepower. Also, the cylinder castings are easier to produce, as the combination of thick and thin sections is avoided. The amount of scrap, should it become necessary to throw away a casting due to leaks therein, is greatly reduced, and this affords a desirable economy.

Figure 3:
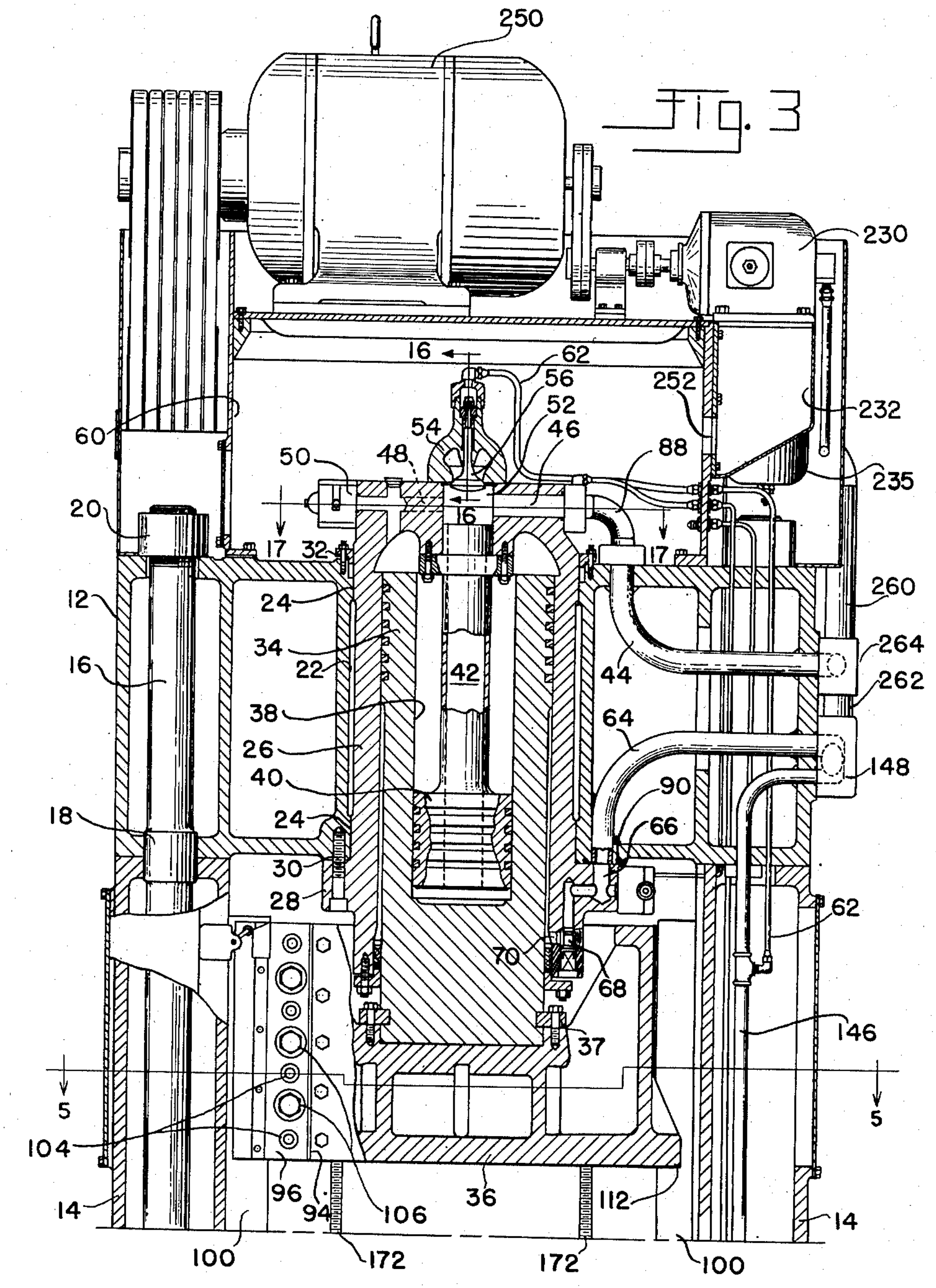
Figure 3 is a vertical sectional view indicated by line 3—3 on Figure 1 and showing the upper half of the press in section.

Reference to Figure 3 will indicate the manner in which the cylinder and head are combined according to this invention. The press head has a central bore 22 therein having smoothly machined parts at its upper and lower ends, as at 24, which receive corresponding machined parts on the cylinder casting 26. Cylinder casting 26 preferably is flanged, as at 28, below the press head, and bolts 30 may extend through this flange into the press head for retaining the cylinder and head in assembled relationship.

It will be noted that flange 28 sustains the vertical thrust on the press cylinder.

At its upper end the press cylinder is preferably engaged by a ring 32 mounted on the press head and packing or other means may be compressed between said ring, head, and cylinder to provide a firm and fluidtight support for the upper end of the press cylinder.

The cylinder is axially bored for receiving the double acting plunger 34 that extends out the bottom of the cylinder for connection with press platen 36, as by means of the split ring 37.

Plunger 34 may also be axially bored from its upper end, as at 38, for receiving the auxiliary ram 40 that is preferably hollow, as at 42, to permit fluid to be supplied to the lower end of bore 38.

Figure 17:
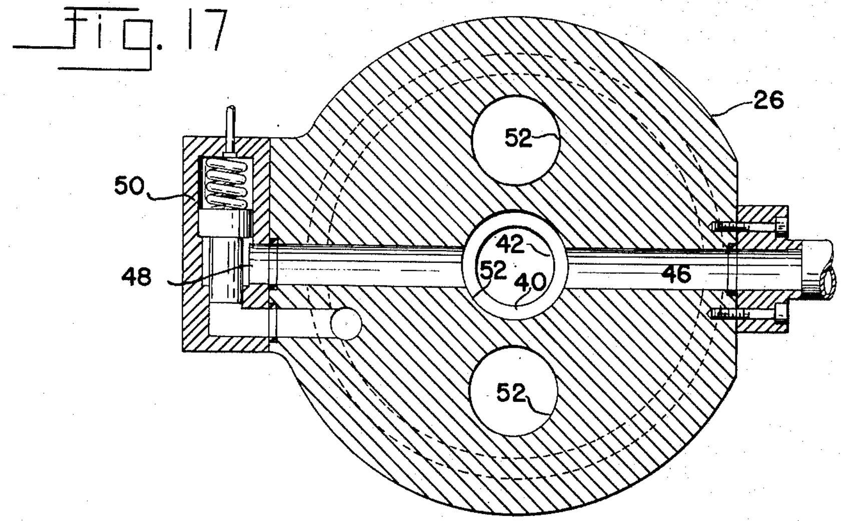
Figure 17 is a plan section indicated by line 17—17 on Figure 3 and showing the construction and arrangement of a pressure shift over valve employed in connection with the main cylinder.

Fluid is adapted for being supplied to the upper end of the press cylinder by a conduit 44 that communicates with a passage 46 in the upper end of the press cylinder. This arrangement will be seen in Figures 3 and 17. In the arrangement shown, passage 46 communicates with the hollow interior 42 of auxiliary plunger 40 and also communicates with inlet 48 of a pressure shift over valve 50 which is preferably mounted on the side of the upper end of cylinder 26.

The press head is provided with a plurality of spaced bores 52 on which are mounted surge valves 54. One of these valves is illustrated in some detail in Figure 16, and it will be noted that it comprises the valve plunger 56 which is normally urged by spring 58 to interrupt communication between the inside of cylinder 26 and reservoir 60 mounted on top of the press head. The surge valves are adapted for opening by suction when the press plunger moves downwardly to admit fluid from the reservoir into the cylinder to prefill said cylinder, and are also adapted for being piloted open by pressure supplied thereto through the conduit means 62 when the press plunger is moving upwardly. As will be seen in Figures 3 and 17, there is one surve valve associated with the auxiliary plunger 40, while there are two surge valves associated with the cylinder 26.

Fluid connection is had with the lower side of plunger 34 by conduit 64 which communicates with a passage 66 formed in flange 28 at the lower end of cylinder 26.

Figures 15, 16, 19, 20:
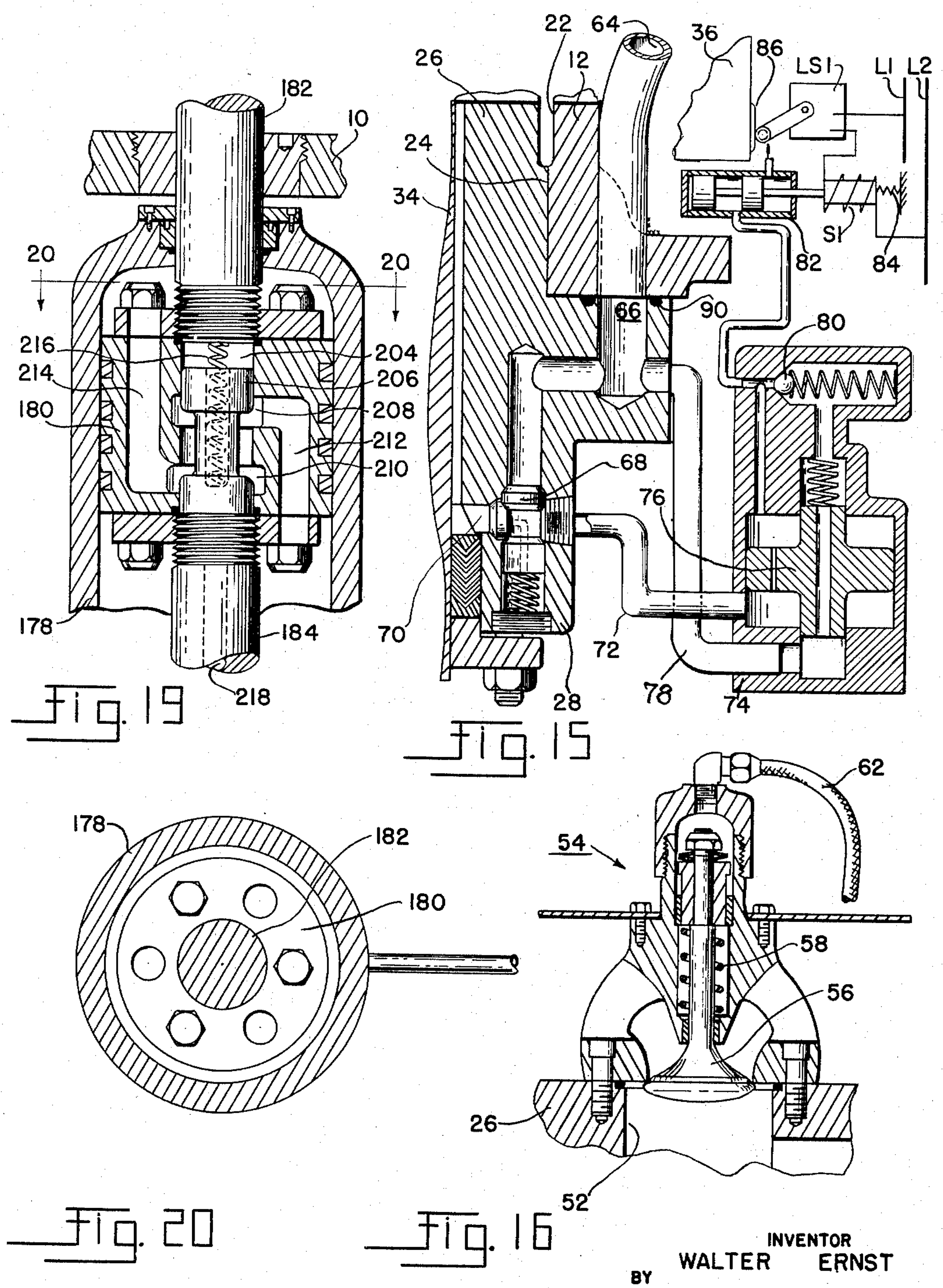
Figure 15 is a sectional view showing the lower right-hand corner of the press cylinder of Figure 3 at a somewhat enlarged scale so as to indicate the nature of the valving arrangement.
Figure 16 is a sectional view indicated by line 16—16 on Figure 3 and showing the construction of the surge valve mounted in the top of the press cylinder.
Figure 19 is an enlarged view of the actuating piston for the blank holder.
Figure 20 is a plan section indicated by line 20—20 on Figure 19 and showing the appearance of the blank holder actuating piston from the top thereof.

The arrangement of this passage and the valves associated therewith will be seen in Figure 15. Passage 66 communicates with the upper face of a check valve member 68 which is spring biased toward its closed position, but which will yield in response to a relatively small pressure from passage 66 to admit fluid from the said passage through port 70 into the lower end of cylinder 26. Check valve 68, however, prevents the escape of fluid from the lower end of the cylinder into passage 66.

Fluid leaving cylinder 26 must pass through conduit 72 which opens into a relief valve 74 beneath the balanced piston 76 thereof. Piston 76 of the relief valve will move upwardly to communicate conduit 72 with conduit 78 leading to passage 66 whenever pressure standing on the opposite faces of piston 76 reaches that value which will cause auxiliary relief valve 80 to open and to exhaust fluid from above piston 76.

In a like manner, valve 74 can be opened by shifting movement of a valve 82 which will be described hereinafter and which is employed for the purpose of bringing about the free exhausting of the lower end of cylinder 26 when so desired. The valve 82 is normally urged closed by a spring 84 and is adapted for being opened by energization of solenoid S1, which, in turn, is adapted for being energized when a limit switch LS1 is closed by a cam 86 carried on the press platen 36. As will be seen in Figure 15, LS1 is connected in series with S1 between the power lines L1 and L2.

It may be noted at this time that the conduits 44 and 64 are permanently affixed in the press head as by welding, so that the removing of the press cylinder or the placing of it in the press is a relatively simple matter and involves a minimum of pipe connections. For example, at the upper end of the cylinder a small elbow fitting 88 may be employed for making connection between conduit 44 and the press cylinder, while at the lower end of the press cylinder the O ring 90 provides the means for effecting connection between conduit 64 and passage 66.

Figure 5:
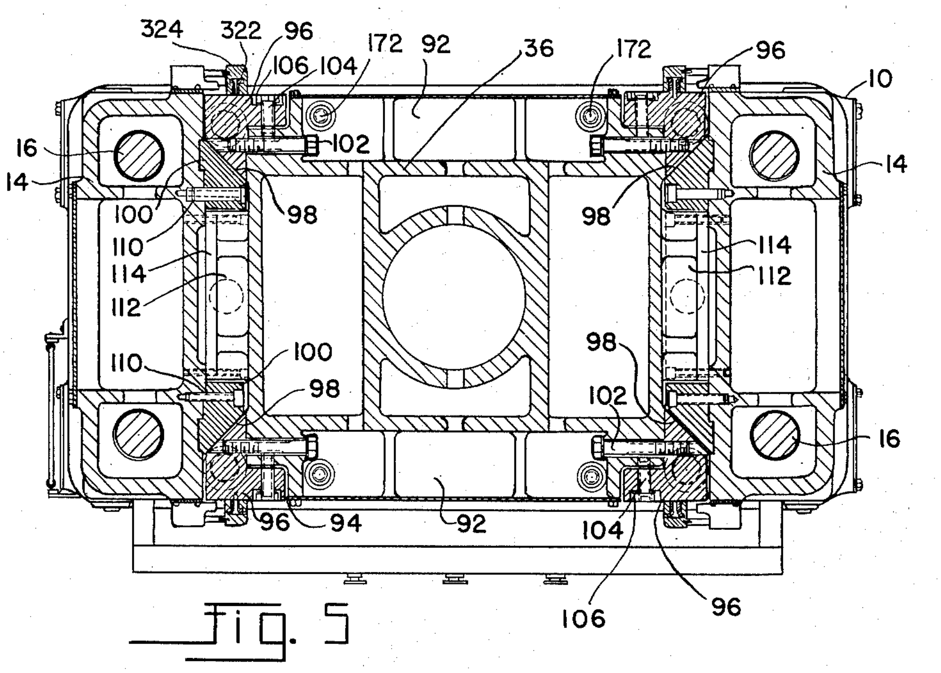
Figure 5 is a transverse section taken through the platen of the press and indicated by the line 5—5 on Figure 3.

Turning now to the press platen, the construction of this member will best be seen in Figures 3 and 5. The platen comprises a cast member having ledges 92 formed in its front and back faces and also having the notches 94 formed in its corners. The notches 94 are for the purpose of adjustably receiving the gib members 96. These members 96 are L-shaped with the end of the leg at the side of the platen bevelled off, as at 98, to bear against the press guides 100.

Gib members 96 are clamped tightly against a machined surface on the side of the platen by bolts 102 which extend through clearance holes in the corners of the platen. The gib members 96 are adjustable toward and away from the guides 100 by means of the set screws 104 extending through the gib members from the front and bearing against one face of the notches 94, and the bolts 106 extending through the gib members and into the said platen.

It will be apparent that the combination of the bolts 102, the abutment screws 104, and the clamp screws 106 provides a ready means for positively determining the location of the gib members 96 on the platen. It will also be noted that there are substantially no twisting forces exerted on any of the said locating means for the gib members or on the gib members themselves, but that any thrusts that are imposed on said gib members due to impending deflections of the platen are carried by the gib members or the fastening means therefor purely in tension or compression.

Figure 9:
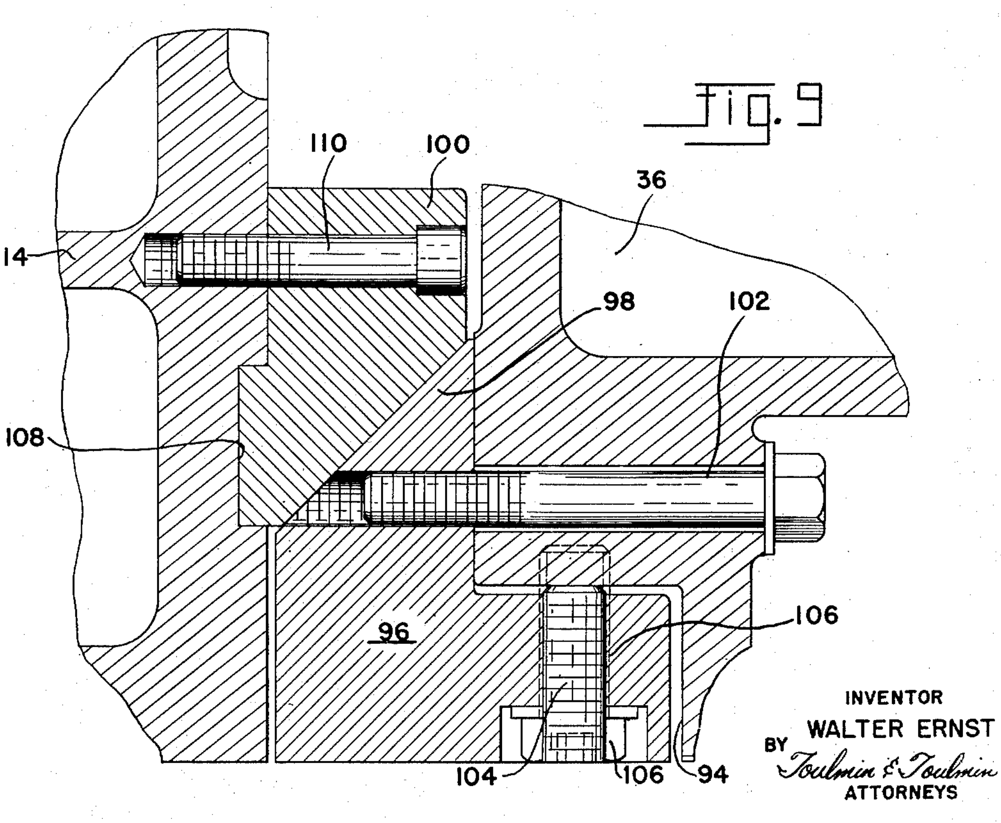
Figure 9 is an enlarged view of the gib guiding arrangement for the press platen and is an enlargement of the lower left-hand corner of the platen as seen in Figure 5.

It may be pointed out at this time that the guides 100 are mounted on the uprights of the press by means of the tongue and groove arrangement which will be best seen at 108 in Figure 9. The groove in the upright can readily be formed by simple machining processes and the tongue on the guide can also be formed thereon in a very simple manner.

The guides are preferably of hardened steel, surface ground, and may either be manufactured or purchased commercially at a reasonable cost. The grooves run the full length of the upright, but the guides are cut off the correct length to give any required daylight and stroke combination. Thus, there is no pattern change or redesigning of the press necessary in changing the stroke-daylight relationship. Bolts 110 may be distributed along the guides for clamping them tightly in position against their associated uprights.

It will be noted in Figures 3 and 5 that the platen 36 has extensions 112 thereon extending into the space between the guides 100. These extensions are utilized for providing a positive stop for the platen by locating the stop blocks 114 on the bed in the space between the guides. The platen is designed to sustain the full tonnage of the press, and the stop blocks 114 and projections 112 on the platen thus represent an inexpensive and effective arrangement for providing a positive stop for the platen and ram.

Figure 7:
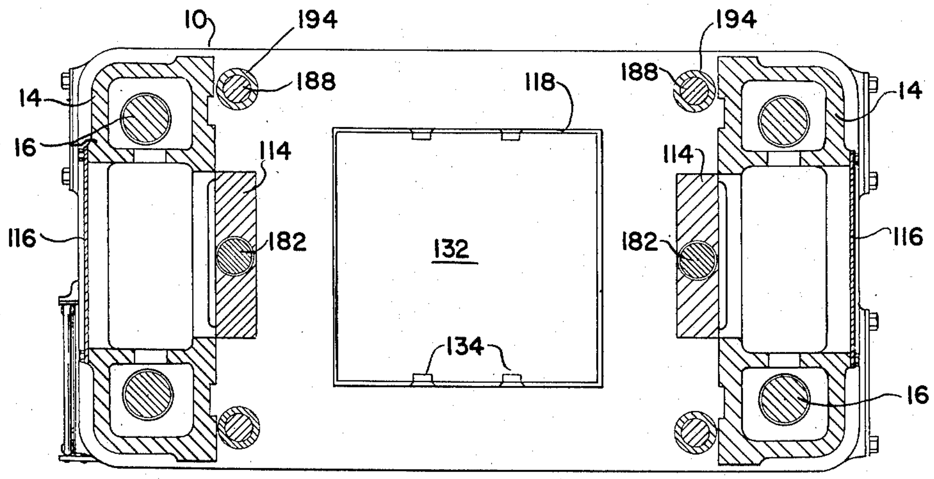
Figure 7 is a view similar to Figures 5 and 6 and is indicated by line 7—7 on Figure 4 and is a view looking down on top of the press bed.

As will be particularly observed in Figure 7, the uprights 14 have through openings therein immediately above the bed 10 of the press and in alignment with the stop blocks 114. These openings are normally closed by cover plates 116, but if it should be desired to operate the press with a transverse through opening for feeding strip stock or the like therethrough, the said cover plates and stop blocks can readily be removed to provide for this feature.

It will also be noted in Figure 7 that if the stop blocks 114 are removed, the press platen can readily be disassembled from the press by dropping it down below the lower ends of the guides 100 and then sliding it laterally out of the press through either the front or back opening thereof.

The press bed, best seen in Figures 4, 7, 8, 10 and 11, is a cast member similar to the head and includes a substantially rectangular central opening 118 which may be utilized for the purpose of receiving a die cushion or ejector unit.

Figure 4:
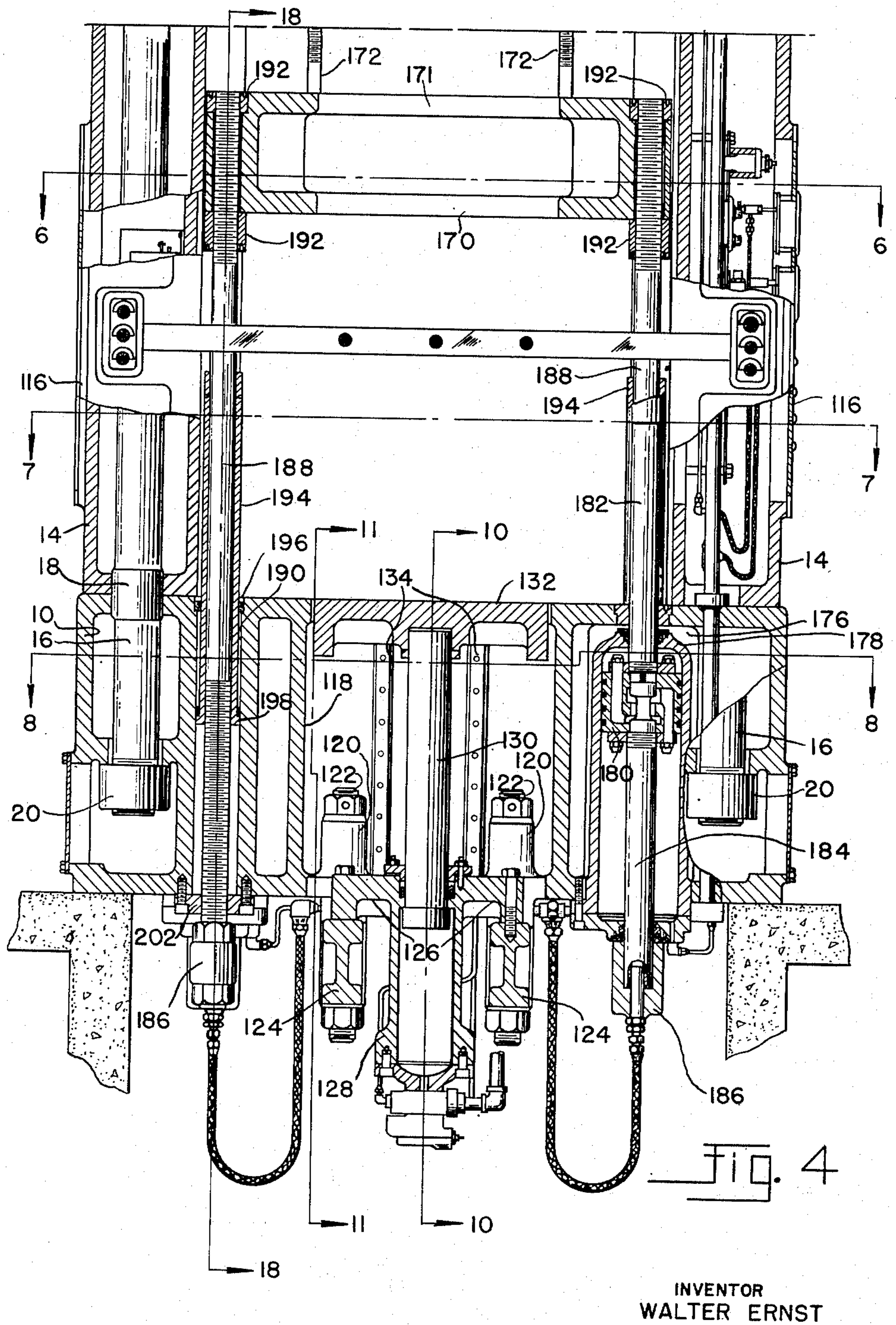
Figure 4 is a view similar to Figure 3 and is indicated by line 4—4 on Figure 1, and shows the lower half of the press section.
Figures 10, 11, 12:
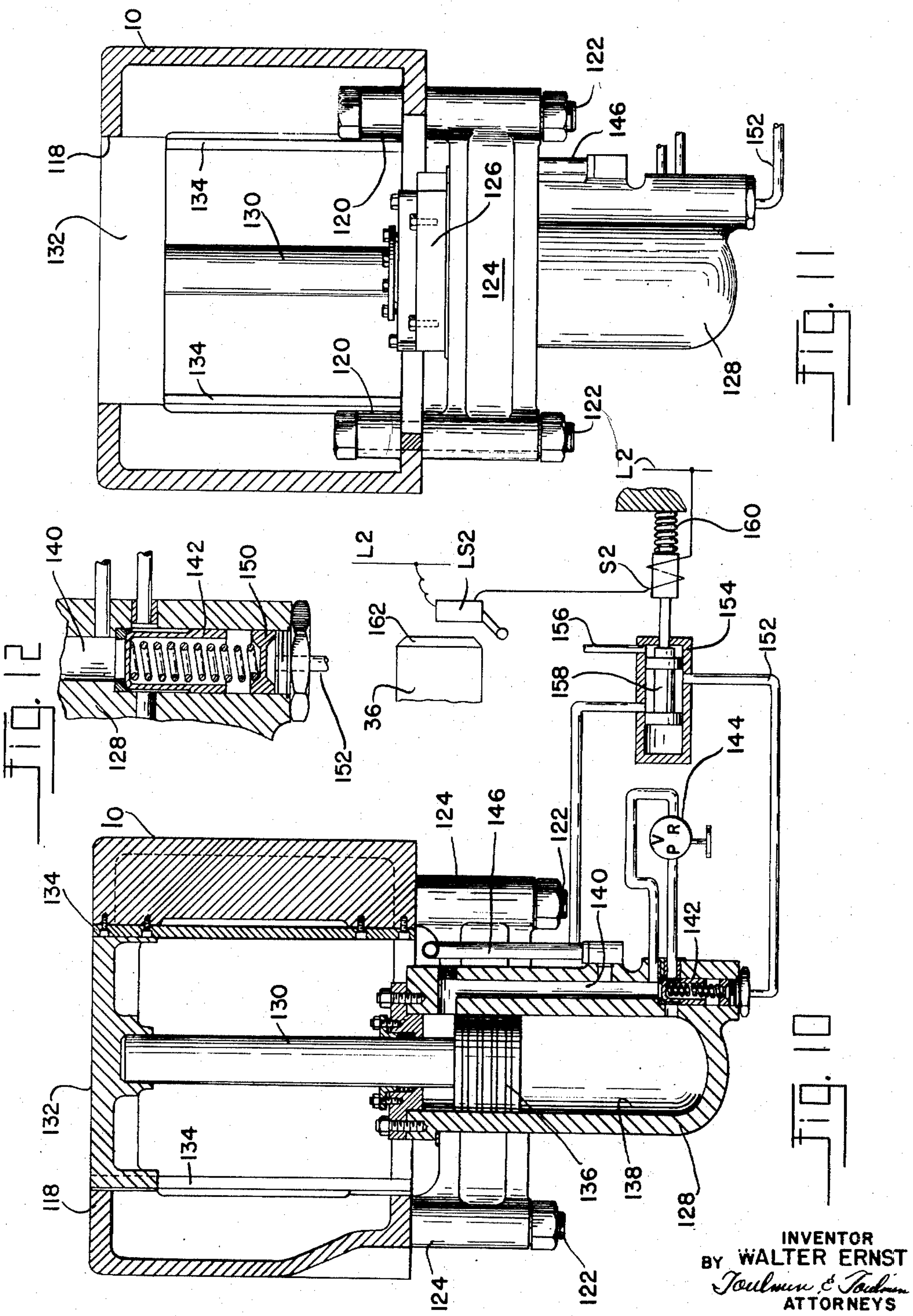
Figure 10 is a vertical section taken through the bed as indicated by line 10—10 on Figure 4 but showing a modified form of die cushion.
Figure 11 is a vertical section indicated by line 11—11 on Figure 4 and shows the manner in which the die cushions of Figures 4 and 10 are detachably mounted on the press bed.
Figure 12 is an enlarged view of the valve located at the bottom of the die cushion cylinder in Figure 10.
Figure 13:
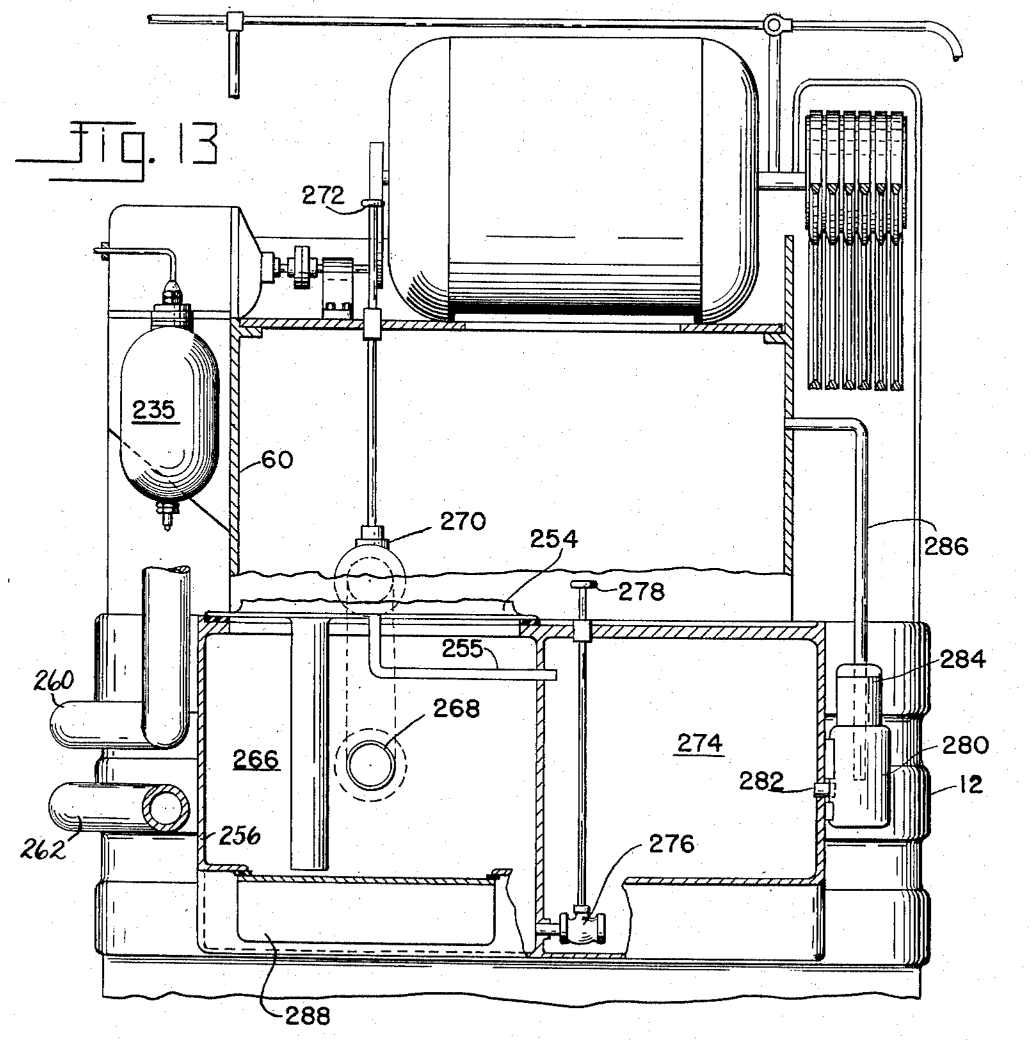
Figure 13 is a vertical section indicated by line 13—13 on Figure 1 and showing the tank arrangement for the press.

A die cushion unit of one type is illustrated in Figure 4, and a somewhat different type die cushion arrangement is shown in Figures 10 and 11, either of these said arrangements being adapted for detachable mounting in the press bed.

The die cushion arrangement of Figure 4 is generally employed when a blank holder is carried by the main platen and can act either as a die cushion or an ejector cylinder. The die cushion arrangement of Figures 10 and 11 is adapted for considerably heavier service than the die cushion arrangement of Figure 4 and is generally utilized when the press is not equipped with a blank holder and, instead, employs a draw ring in association with the drawing die in order to obtain the requisite blank holder action. The difference between the die cushion arrangements of Figures 4 and 10, is, therefore, essentially one of degree and not of kind.

For detachably receiving the die cushion or ejector assembly, the press bed has the upstanding bored bosses 120 through which the strain rods 122 can be passed for supporting the beams 124 that extend from the front to the back of the press and on the underneath side of the bed. These beams are adapted for receiving the projecting parts 126 of the die cushion or ejector cylinder 128 which reciprocably receives a plunger 130 on the upper end of which is mounted a platen 132. Platen 132 is adapted for being guided in its reciprocatory movements by the guide rails 134 mounted on the faces of ribs about the cavity 118.

It will be understood that usually there is a bolster plate resting on the upper surface of the press bed and that the platen 132 will normally bottom against the underneath side of the said bolster plate. In the manufacture of the press, the press bed is always formed with the rectangular opening 118 extending therethrough and with the upstanding bored bosses 120, so that at any time it is desired to do so, the die cushion or ejector assembly can be mounted in the press or removed therefrom. The illustrated arrangement permits this to be done in a minimum of time and at a minimum of expense.

The die cushion arrangement of Figure 4 and that of Figure 10 have in common the feature of a check valve connected with the cylinder to prevent the displacement of fluid therefrom while permitting fluid to flow to the cylinder to raise the die cushion platen. In each case, the check valve is by-passed by a relief valve opening away from the cylinder so the die cushion platen will yield at a predetermined thrust and means are provided for locking the check valve closed to delay the upward movement of the die cushion platen, if so desired.

In Figure 4, the die cushion ram is single acting in its cylinder, whereas in Figures 10 and 11, the die cushion plunger 130 is double acting by means of a piston 136 which closely fits in bore 138 of the die cushion cylinder 128.

The upper and lower ends of bore 138 are interconnected by passage 140 which has therein the check valve 142 adjacent the lower end of the cylinder and which is by-passed by relief valve 144. In operation, when the die cushion platen 132 is urged downwardly by the action of the press, the fluid from beneath piston 136 is forced through relief valve 144 and this generates the required pressure action upwardly on piston 136.

Part of the fluid displaced from the lower end of bore 138 passes to the upper end thereof through passage 140, and the remainder passes through conduit 146 to the flange fitting 148 mounted on the side of the press head and which is connected with conduit 64 leading to the push back side of the press plunger 34.

When the pressing operation of the press is complete and the main platen of the press commences to move upwardly, pressure is supplied to flange fitting 148 to pass therefrom into conduit 64 and conduit 146. At this time the die cushion platen 132 may follow the main press platen upwardly or may be delayed in its return. This is accomplished by the valving arrangement shown in Figures 10 and 12.

The check valve 142 normally yields to pressure standing on its upper face in passage 140 but may be held stationary by a piston 150 whch is adapted for being moved upwardly against the bottom of the check valve member by pressure conducted thereto through conduit 152. Conduit 152 is connected with conduit 146 by a three-way valve 154 that includes an exhaust line 156 and a movable valve member 158.

Valve member 158 is normally urged by a spring 160 into position to connect conduit 152 with conduit 156. However, energization of a solenoid S2 by closure of limit switch LS2 by a cam 162 on the press platen 36 will move valve member 158 into the position shown, wherein conduit 152 is connected with conduit 146. With the valve member so shifted, the pressure supply to conduit 64 for raising the press plunger and press platen will also act on piston 150 and hold check valve 142 closed, thereby preventing upward movement of the die cushion platen. When the press platen has moved far enough to release limit switch LS2, solenoid S2 is de-energized, spring 160 is again effective to connect conduit 152 with exhaust conduit 156, and check valve 142 is then free to open under the pressure in passage 140 and to bring about upward movement of the die cushion plunger and platen.

It is to be noted that the die cushion plunger 130 and piston 136 are so designed that the cross-sectional area of plunger 130 is sufficient to bring about upward movement of the plunger and platen when check valve 142 is open, and that piston 136 is of such a size that the necessary thrust is exerted thereon to give the proper die cushion action. Then, by means of the interconnecting passage 140, the only fluid that it is ever necessary to supply to the die cushion unit through the conduit 146, or to convey away from the die cushion unit, is the amount of fluid displaced by the plunger 130 as it reciprocates in the cylinder 128. A relatively small conduit can be utilized for conveying this amount of fluid and the arrangement represents a definite economy of piping.

In many instances it is necessary to supply a press of the type illustrated with a blank holder arrangement for holding a blank during a drawing operation. An arrangement especially adapted for use in connection with a press of this construction will be best seen in Figures 4, 6, 18 and 21, with certain of the details thereof illustrated in enlarged scale in Figures 19 and 20.

The blank holder arrangement comprises a blank holder platen 170 positioned beneath the main platen 36 and suspended therefrom by the pick up rods 172 which pass loosely through bored holes in the ledges at the front and back faces of the main platen. Platen 170 has a central opening 171 to admit a punch or the like to be carried by the main platen for acting on the center part of a blank, the periphery of which is to be engaged by the blank holder platen.

Figure 6:
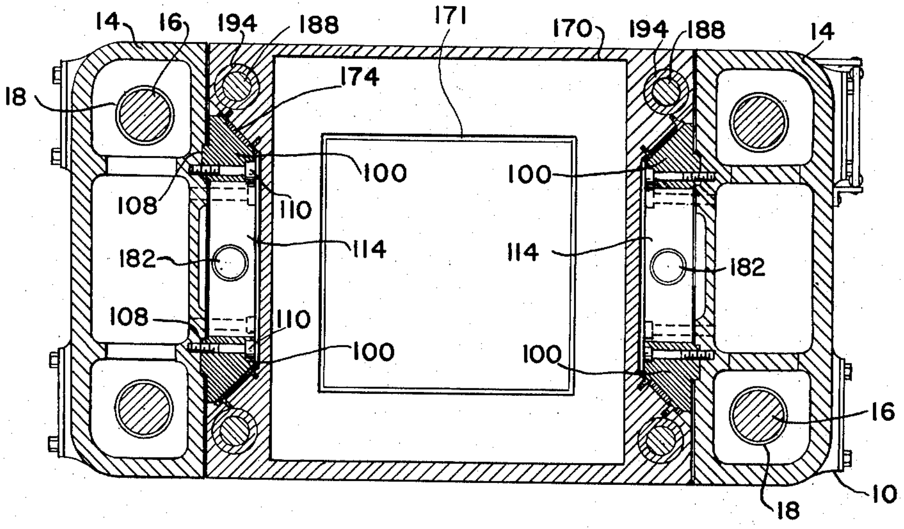
Figure 6 is a view similar to Figure 5 but is taken through the blank holder platen of the press and is indicated by line 6—6 on Figure 4.
Figure 21:
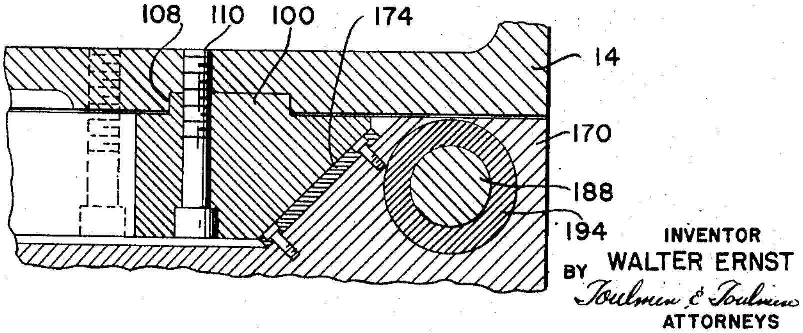
Figure 21 is a fragmentary view showing the arrangement employed for guiding the blank holder platen on the guide rails of the press.
Figure 8:
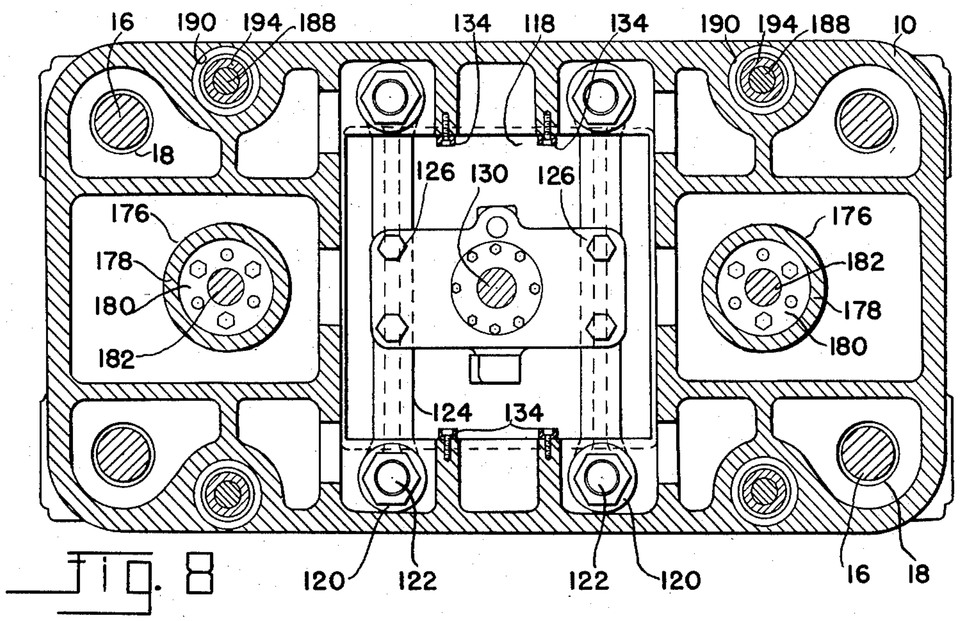
Figure 8 is a transverse section taken through the press bed and is indicated by line 8—8 on Figure 4.

The blank holder platen is generally stationary while it is working and therefore does not require the heavy gib arrangement already described in connection with the main platen. Rather, the blank holder platen, and as will be seen in Figures 6 and 21, is so shaped as to extend along the diagonal faces of the guides 100 and engagement of the blank holder platen with the said guides is accomplished by means of the relatively thin wear plates 174 bolted on the diagonal faces of the blank holder guide surfaces so as to bear directly on the diagonal faces of the guides 100.

According to this invention, the usual arrangement for actuating the blank holder platen from above is completely eliminated, and instead there are provided cylinders and pistons detachably mounted in the press bed and having upwardly extending rods connected with the blank holder platen so as to pull it downwardly with the proper amount of force.

Figure 18:
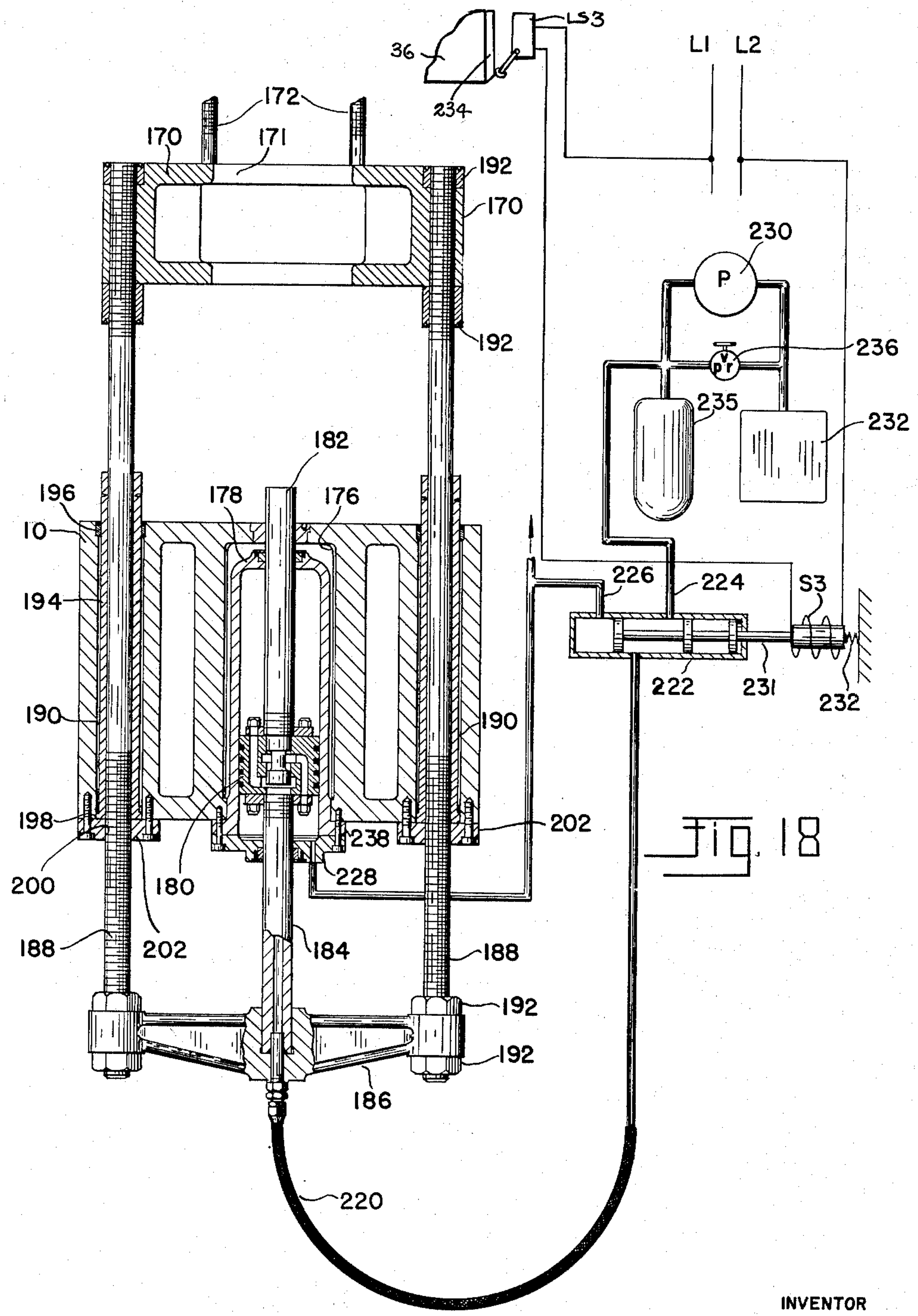
Figure 18 is a vertical section indicated by line 18—18 on Figure 4 and shows the construction of the blank holder for the press together with the actuating circuit therefor.

The blank holder actuating arrangement is fully illustrated in Figures 4 and 18, wherein it will be seen that the press bed 10 has a cavity on each side thereof opening upwardly from the bottom, as at 176, for receiving one of the two blank holder actuating cylinders 178. Reciprocable in each cylinder 178 is a double acting piston 180 having rod members of equal diameters extending from its opposite faces, as at 182 and 184. The lower of the rods 184 each have connected therewith a yoke member 186 extending from the front to the back of the press.

At each end of each of the yokes 186 there are connected the vertically extending pull down rods 188 which extend through suitable bores 190 in the press bed into engagement with the blank holder platen 170. Nuts 192 may comprise the means for tightly clamping the rods to the yokes 186 and to the blank holder platen. It will be observed that the rods 188 are connected at the corners of the blank holder platen. This is desirable in order to give the proper distribution of force over the blank holder platen and also regulate the blank holder pressure at the several corners, should it be so desired.

The rods 188 are adapted for being stopped in a predetermined downward position by adjustable sleeves 194 thereon which pass through bushings 196 at the top of the bed 10, and have heads 198 thereon at their lower ends which fit relatively closely in bores 190. The sleeves 194 are adjustable on rods 188 by being threaded thereto, as at 200, and are adapted for abutting the caps 202 secured to the bed at the lower ends of the bores 190.

As will be seen hereinafter, when the blank holder 170 is in its actuated position, the sleeves 194 all bottom against caps 202 and adjustment of the sleeves on the rods is effective for regulating the action of the blank holder platen at its respective corners.

According to this invention, the actuation of the blank holder platen by means of the pistons 180 is accomplished by the supplying of a minimum amount of fluid to the said pistons. This is due in part to the fact that the opposite faces of pistons 180 are equal in area, and in part to the fact that the blank holder moves to its working position before any pressure is applied, and then dwells there stationarily under pressure, as contrasted to blank holder arrangements of the prior art where either the blank holder, its actuating plunger, or the cylinder for the said plunger are in movement during the supplying of pressure thereto, thus entailing a considerable expenditure of power, which is eliminated with the instant invention.

Reference to Figures 18, 19 and 20 will serve to make the operation of the blank holder arrangement of this invention clear.

The blank holder pistons 180 each comprises a central bore 204 that reciprocably receives a valve piston 206. The bore 204 comprises the spaced grooves 208 and 210 with the groove 208 communicating by passage means 212 with the space in cylinder 178 below the piston and the groove 210 communicating by passage means 214 with the space in cylinder 178 above piston 180.

Piston 206 is normally urged downwardly into the position which it occupies in Figure 19 by compression spring 216 bearing between the said piston and the lower end of rod 182. In this position the piston affords free communication between the opposite ends of cylinder 178, so that the piston 180 and its rods 182 and 184 can reciprocate freely in cylinder 178 without any fluid being displaced therefrom or supplied thereto.

The lower rod 184 has a passage 218 therethrough that communicates with a flexible conduit 220 leading to one port of a valve 222 to which is also connected the pressure conduit 224 and exhaust conduit 226. Exhaust conduit 226 leads to one of the tanks at the upper part of the press and is also connected with the lower end of cylinder 178 by means of the end cap 228 thereof.

Valve 222 has therein a reciprocable valve member 231 that is normally positioned by spring 232 to connect conduit 220 with exhaust conduit 226. Solenoid S3 is associated with valve member 231 and is adapted for energization by closure of a limit switch LS3 to move the valve member into position to connect conduit 220 with pressure conduit 224. Switch LS3 is adapted for being closed by cam 234 mounted on the press platen 36 and adapted for engagement with the said switch LS3 when the blank holder platen reaches its working position.

When conduit 220 is connected with the pressure conduit 224 by actuation of valve member 231 through energization of solenoid S3, the pressure conducted through conduit 220 and up through hollow rod 184 urges valve piston 206 into its uppermost position, as shown in Figure 18. In this position, valve piston 206 interrupts communication between the upper and lower ends of cylinder 178 and instead connects the upper end of the said cylinder with the supply of pressure fluid in conduit 220 and hollow rod 184.

The pressure so supplied to the upper end of cylinder 178 acts downwardly on piston 180 and urges the blank holder platen downwardly toward the blank which is therebeneath. As has been mentioned before, when the blank holder is in working position, sleeves 194 bottom against caps 202 and it will now be seen that the individual pressures in the several corners of the blank holder platen can be independently adjusted by adjustment of the sleeves 194. It will also be seen that a minimum of fluid under pressure is required for obtaining the blank holder action, due to the fact that the blank holder platen and its actuating pistons are in working position before pressure is supplied to the said pistons.

It will be noted that the arrangement of limit switch LS3 and its actuating cam 234 is such that the blank holder is moved completely to working position before the limit switch is engaged by the said cam. In this manner no movement of pistons 180 takes place during the supply of pressure thereto by accumulator 235 and pump 230.

Similarly, when the main press platen moves upwardly during its retraction stroke, it permits limit switch LS3 to open, thereby deenergizing S3 and exhausting the pressure fluid from the blank holder cylinder prior to the picking up of the blank holder platen by the main platen.

The means for supplying the actuating pressure for the blank holder pistons is shown in Figure 18, and it will be seen to comprise a fluid pump 230 which draws fluid from a tank 232 and discharges it into an accumulator 235 which is connected with conduit 224. A relief valve 236 may be connected between the discharge side of the pump and the tank 232 and may be manually adjustable to provide a free by-passing of the pump discharge back to the tank when the blank holder is not in use.

Preferably, pump 230 is of the type having controls integral therewith which reduce the stroke of the pump at a predetermined pressure, thereby reducing the power requirements for operating the pump.

It will be observed that the entire blank holder arrangement can readily be installed in a press constructed according to this invention, or, if already assembled with the press, can readily be removed therefrom. No change in the press design is required to add the blank holder and it is only necessary to supply the requisite parts and to assemble them in proper relation with the other parts of the press. It might be noted that the cylinders 178 are flanged, as at 238, at their lower ends, so that the working thrust exerted on the blank holder is carried on the underneath surface of the bed and acts upwardly thereon.

It is to be noted that the blank holder imposes no load whatsoever on the press frame except a certain amount of compression loading on the press bed, and which loading in no way influences the design of the press frame. Thus, if a three hundred ton press were to be constructed and with a press frame to carry the three hundred tons load, it would not be necessary to redesign the press frame in order to associate with it a blank holder arrangement with a rating, say, of one hundred tons.

It will be evident that this is of distinct advantage in giving the press a great deal more utility, in making it more inexpensive to construct, and in permitting a press user to convert it readily from one type of operation to another.

Turning now to the hydraulic power unit for the press and to the arrangement thereof, including the pumps, tanks, reservoir, and other auxiliaries, these are mounted on the head of the press, and the arrangement thereof will best be seen on reference to Figures 1, 2, 3, and 13.

Mounted on the upper surface of the head of the press is the reservoir 60 comprising any suitable constructional arrangement for retaining the hydraulic fluid for the press and for supporting the press drive motor 250. Into this reservoir 60 extends the upper end of the press cylinder 26 and the previously described surge valves 54 and the passages 52 which they control provide a means for communicating with reservoir 60 and with the interior of cylinder 26.

At this time it will be noted that the packing means which is compressed by gland 32 around the top of cylinder 26 is useful for sealing against leakage of hydraulic fluid from reservoir 60. The upper surface of reservoir 60 mounts drive motor 250 and belted thereto is the pump 230 which supplies pressure fluid for actuating the blank holder of the press. The pump 230 is positioned over its tank 232 which is mounted on the side wall of reservoir 60 and communicates therewith through opening 252.

The main hydraulic pump for supplying pressure fluid to the opposite sides of press ram 34 is indicated at 254 and is mounted on the tank arrangement 256 that is carried on the back of the head 12 of the press, as by the mounting bolts 258. Pumps 230 and 254 are belt connected to drive motor 250, and this is of advantage in enabling motors of standard speed to be utilized with the customary pumps which generally operate at considerably lower speed than standard speed motors.

The belt connecting of the drive motor to the pumps is also of distinct advantage in supplying the foreign market and other areas where odd frequencies of current supply make it difficult to drive the pump at the proper speed by directly connecting it to the drive motor.

The pump 254 is of the reversing type, preferably having controls integral therewith, and has its two discharge ports connected by conduits 260 and 262 with the flange fittings 264 and 148 mounted on the side of the press head, as will be seen in Figures 1 and 3.

The arrangement illustrated is of great advantage, because the pump and its conduits can readily be removed from the press at any time for repair or replacement, and the connections between the flanges 264 and 148 and the press cylinder and the other auxiliaries of the press need not be disturbed.

Pump 254 rests on the top wall of tank 256 and is connected for drawing any makeup fluid required from the compartment 266 of the said tank by means of any suitable and conventional shuttle valve arrangement, not illustrated. Compartment 266 of tank 256 is adapted for communication with reservoir 60 by a conduit 268 permanently mounted in the press head and having a shut off valve 270 positioned in reservoir 60 that can be adjusted by the manual operator 272 from above the said reservoir.

Tank 256 comprises a second compartment 274 adapted for communication with compartment 256 by a valve 276 that also has an operating handle 278 that can be controlled from externally of the said tank. Compartment 274 is normally disconnected from compartment 266 by closing of valve 276 and is connected with the several drain and exhaust lines previously referred to and also the slippage line 257 from pump 254 so as to accumulate the fluid which is exhausted at various locations in the press.

It will be seen that the pump compartment 266 is always under some head so that cavitation is eliminated when the pump draws make-up fluid therefrom. Compartment 274, on the other hand, is always under atmospheric pressure for receiving fluid it is desired freely to exhaust from the valves, cylinder, and pump housings.

The fluid which is delivered to compartment 274 is conveyed back to reservoir 60 by means of the small pump 280 mounted on the side of tank 256 and opening into compartment 274, as at 282. Motor 284 drives pump 280 and the discharge line 286 of the pump 280 is connected directly into reservoir 60.

The valve 270 between reservoir 60 and compartment 266 is provided for closing off the supply of fluid to the said compartment, should it be desired to remove the lower cover plate 288 of the compartment for cleaning, or if it should become necessary to remove the entire tank for any reason.

Figure 14:
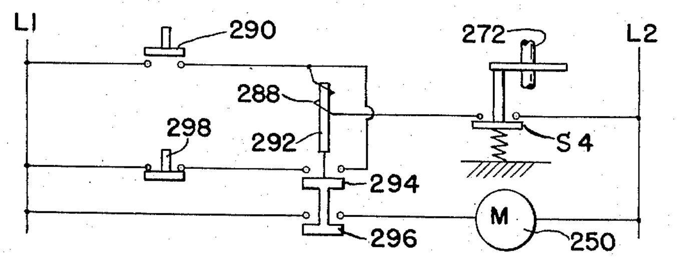
Figure 14 is a diagrammatic view showing an electrical circuit which interlocks the operation of the drive motor of the press with one of the connecting valves between the tanks of Figure 13.

However, in order to prevent operation of the pump 254 when valve 270 is closed, there is provided an interlock between the valve 270 and the energizing circuit for motor 250. This interlock is shown in Figure 14, wherein it will be seen that the manual operator 272 of valve 270 is adapted for opening a switch S4 when the said valve is closed. This switch S4 is in series between the power lines L1 and L2 with solenoid 288 and a start switch 290. Solenoid 288 controls an armature 292 having blades 294 and 296. Blade 294 provides a holding circuit for solenoid 288 through stop switch 298, whereas blade 296 provides an energizing circuit for the main drive motor 250.

It will be evident that at any time valve 270 is closed, it will be impossible to energize motor 250 for driving pump 254, thereby preventing possible damage to the pump due to an insufficient supply of oil thereto.

The controls for the press in general comprise three groups of electrical control elements. These groups are as follows:

1. The manual controls which must be accessible to the press operator for operation thereby;
2. The controls to determine certain modes of operations and which are preferably accessible only to the foreman or job setter;
3. Controls operated by movement of the press platen for accomplishing certain functions.

The first group of controls consists of two forward push buttons 308 and a stop button 310 mounted on a cross rail 312 extending between the uprights of the press. The first group also includes the start and stop buttons and the control on-off switch located in the left-hand upright, as indicated at 314 in Figure 2. Also included are the jogging switches and the manual-automatic selector means, and which are located in the right-hand upright, as at 316. These control elements and the instrumentalities which they operate are well known in the art, and in themselves form no part of the instant invention, except as to their location.

The second group of controls, those which are preferably only accessible to the foreman or job setter, are mounted on a panel inside the right-hand upright under lock and key. This panel arrangement is shown at 318 in Figure 1 and may comprise one of the closure members 116 previously referred to in connection with obtaining a through opening transversely of the press. This group of controls may consist of a control switch for the slippage pump 280, a selector switch for determining semi or full automatic operation of the press, and such selector switches and adjustable valves as may be provided in connection with the blank holder and die cushion arrangements.

The third group of controls includes the limit switches which are actuated by the press platens. These switches are preferably mounted on finished pads located on the uprights, as at 320, and are adapted for actuation by cams 324 adjustably mounted on T rails 322 carried on the corners of the press platen. The arrangement of the limit switches, the T rails, and the cams thereon will be seen in Figures 1, 2, and 5. One of cams 324 corresponds to cam 234 described for controlling the blank holder motors.

A complete set of limit switches for operation of the press when it is fitted with both blank holder and die cushion could consist of the following:

(*a*) Return stop limit switch;

(*b*) Slow down limit switch for press platen;

(*c*) Limit switch for admission of pressure to blank holder pistons;

(*d*) Switch for controlling delayed return of the die cushion platen; and (*e*) Position reversal switch.

These switches carry out the following functions:

The return stop limit switch at LS10 in Figure 1 stops the press platen 36 at a predetermined point at the end of its return stroke by causing the hydraulic pump 254 to move to its center or zero stroke position.

The slow down limit switch at LS1 in Figure 15 actuates the venting valve 82, described in connection with the operation of relief valve 74, and causes the platen 36 to slow down at a predetermined point during its downward travel.

The operation of the limit switch LS3 for admitting pressure to the blank holder pistons 180 has already been described in connection with the operation of the blank holder mechanism.

The operation of the switch LS2 for controlling the delayed return of the die cushion platen 132 has also been described in connection with the operation of the die cushion mechanism.

The position reversal switch indicated at LS11 in Figure 1, can be utilized for causing immediate reversal of the press platen 36 at any preselected point during its downward travel by engagement of the switch by one of the platen carried cams 324.

According to well known practices, switch means could also be provided for causing reversal of the press platen 36 at the bottom of its stroke due to the development of a predetermined pressure on the press ram. An automatic recycling of the press ram 36 could be obtained by utilizing the return stop switch LS10.

*Operation*

A number of the features of this invention may be better understood by considering the operation of the press. First considering the operation of the press on a single action cycle, let it be assumed that the press ram is in its uppermost position and that the motor 250 is energized thereby driving main pump 254. Pump 254 is normally centered by controls integral therewith, and the main platen therefore remains in its uppermost position. An advancing stroke of the main ram and platen of the press can be had by causing pump 254 to shift into position to draw fluid in through conduit 262 leading to the push back side of the said ram and to discharge fluid through the conduit 260 leading to the upper end of the ram.

During the initial advancing movement of the press platen, valve 82 is so positioned as freely to drain fluid from above piston 76 in valve 74, thereby permitting valve piston 76 to raise and to connect conduit 72 with passage 66 leading to conduit 262. It will be evident that the press ram will move downwardly as rapidly as the pump draws fluid through conduit 262. During this initial advancing movement of the press ram, the surge valves 54 open to admit fluid from tank 60 to the top surface of the press ram.

When the platen has advanced to a predetermined point, cam 86 actuates limit switch LS1, thereby de-energizing solenoid S1 which permits valve 82 to close, thereby interrupting the exhaust of fluid from above valve piston 76. This causes valve 74 to close, thus entrapping fluid in the push back side of the press ram. The pump 254 will now deliver fluid under pressure through conduit 260 and passage 46 through hollow ram 40 to act on that part of the upper surface of the press ram directly beneath ram 40. The press ram and platen will now advance at a rate determined by the rate of fluid supply from pump 254 through conduit 260.

The fluid expelled from the push back side of the ram will be discharged through valve 74 when the pressure on the said fluid reaches that value which will cause opening of auxiliary relief valve 80.

If the pressure requirements of the job being done are sufficient, then pressure shift over valve 50 will open and connect passage 46 with the upper surface of the press ram. The rate of advance of the press ram and platen is now determined by the rate of fluid supply through conduit 260 to the entire upper faces of the said press ram.

Retracting movement of the press ram can be had merely by reversing the direction of delivery of pump 254. The pump when reversed delivers fluid through conduit 262 to the push back side of the press ram. During retraction of the press ram pressure fluid is conducted through pilot conduit 62 to the several surge valves 64 and causes them to open, thereby permitting free discharge of the fluid from the upper working areas of the press ram back into tank 60.

Upward movement of the press ram and platen is accomplished by fluid supplied to the push back area of the ram from channel 66 through check valve 68 and port 70. It will be noted that check valve 68 offers substantially no resistance to this fluid flow.

If the press is to be operated with the die cushion, the previously mentioned operating cycle obtains, but die cushion action is had when the work is engaged by the platen and moved downwardly so as to move die cushion platen 132 downwardly. When the die cushion platen is so moved, the accompanying downward movement of plunger 130 and piston 136 is resisted by the setting of relief valve 144.

Prior to the completion of the pressing stroke, cam 162 on platen 36 actuates switch LS2, thereby energizing S2 and moving valve member 158 into position to connect conduit 146 with conduit 152. Then, when the press platen starts up and the supply of fluid to the push back side of the press ram is conveyed through conduit 146 to passage 140, it is also conveyed through conduit 152 to piston 150 which moves upwardly and holds check valve 142 closed. This prevents upward movement of the die cushion piston, ram, and platen. However, when cam 162 runs off switch LS2, valve member 158 shifts to exhaust conduit 152, thereby releasing piston 150 and check valve member 142 so that pressure in passage 140 can act on both faces of piston 136 and urge it upwardly together with plunger 130 and die cushion platen 132.

The valve 154 may, of course, be made inoperative so that die cushion platen 152 will follow the main platen upwardly immediately, if so desired.

If the press is operated as a blank holder press, then the previously described operating cycle for the main press ram and platen still obtains, except that as the main platen 36 descends, the blank holder platen 170 suspended therefrom also descends. Descending movement of blank holder platen 170 is accompanied by descending movement of the blank holder actuating pistons 180 in their cylinders 178. This, in turn, is accompanied by a free exchange of fluid between the opposite ends of cylinders 178 through the passage means in the blank holder actuating pistons.

When the blank holder reaches position to engage the work which is being drawn in the press, or is positioned immediately thereover, sleeves 194 bottom against caps 202 and halt further descending movement of the blank holder platen and its actuating pistons. Thereafter, cam 234 on main platen 36 engages switch LS3, thereby actuating valve member 231 to connect pressure conduit 224 with conduit 220, so that valve pistons 206 move into position to interrupt the flow passages through the blank holder actuating pistons 180, and instead connect the pressure conduit 220 with the upper faces of the said pistons.

This will urge the blank holder actuating pistons downwardly, and this will cause a thrust to be conveyed to the blank holder platen through the yokes 186 and pull down rods 188. The exact amount of pressure exerted on each corner of the blank holder platen can be regulated by adjustment of sleeves 194 and their respective rods 188.

When the main platen is reversed and moved upwardly, the blank holder platen 171 remains in its actuated position until picked up by the main platen through pick up rods 172. Prior to picking up platen 171, platen 36 allows switch LS3 to open, thereby de-energizing S3 and permitting valve member 231 to move into position to exhaust conduit 220, thereby, in turn, releasing valve pistons 206 and re-establishing the passages through the blank holder actuating pistons.

Continued upward movement of the main platen and blank holder platen can then continue with fluid freely passing from the upper end of cylinders 178 through pistons 180 to the lower ends of the said cylinders.

It will be understood that the press of this invention can be a simple assembly consisting of the press frame with the main press platen and the actuating mechanism therefor, or that the same press can be equipped with either the blank holder arrangement described, or the die cushion arrangement also described, or both. The addition of either or both of these auxiliaries does not require the provision of additional hydraulic power means, except for the small pump 230 that supplies accumulator 235, because neither of the said auxiliaries requires any substantial amount of actuating fluid and imposes no load on the hydraulic actuating system for the main platen, or any substantial mechanical load on the said platen.

Certain features of the press and the auxiliaries therefor illustrated in this application but not claimed herein form the basis for my co-pending applications Serial Numbers 190,481, 193,645, 196,620, 202,056, 203,664, and issued Patent No. 2,576,584, dated November 27, 1951.

It will be understood that this invention is susceptible to modification in order to adapt it to different usages and conditions, and, accordingly, it is desired to comprehend such modifications within this invention as may fall within the scope of the appended claims.

I claim:

1. In a press having a press frame and a main platen reciprocable therein, a blank holder platen suspended from said main platen but movable theretoward, a rod connected with each corner of said blank holder platen and extending downwardly therefrom, a pair of yokes each interconnecting two of said rods at their lower ends, and a pair of fluid motor means detachably mounted in the press frame under the bed and each connected with the center part of a different of said yokes for acting downwardly thereon whereby blank holder action is obtained by placing said rods in tension, each said rod including independent stop means to predetermine the lowermost position thereof.

2. In a press having a frame including a bed and a main platen reciprocable toward and away from said bed, a blank holder platen suspended from said main platen but movable theretoward, a rod connected with each corner of said blank holder platen and extending downwardly therefrom through said bed, a pair of yokes each extending between the lower ends of two of said rods, a plunger connected with the midpoint of each of said yokes extending upwardly therefrom, each plunger including piston means between its ends, cylinders reciprocably receiving said piston means and detachably mounted in said bed, and each said rod including adjustable stop means for limiting its downward movement.

3. In a blank holder arrangement for a press having a frame with a bed, a cylinder detachably mounted in said bed, a piston in said cylinder, equal sized plungers extending from said piston out opposite ends of said cylinder, a yoke connected with the lower end of the bottom one of said plungers, a rod connected with each end of said yokes and extending upwardly therefrom through said bed, a blank holder platen mounted on the upper ends of said rods, and adjustable stop means for stopping said rods in a predetermined lowered position relative to said bed.

4. In a blank holder arrangement for a press having a frame with a bed, a cylinder detachably mounted in said bed, a piston in said cylinder, equal sized plungers extending from said piston out opposite ends of said cylinder, a yoke connected with the lower end of the bottom one of said plungers, a rod connected with each end of said yoke and extending upwardly therefrom through said bed, a blank holder platen mounted on the upper ends of said rods, and adjustable stop means for stopping said rods in a predetermined lowered position relative to said bed, said adjustable stop means comprising sleeves adjustably mounted on said rods and abutments carried by said bed for engaging the lower ends of said sleeves.

5. In a press having a blank holder platen, a cylinder, a piston in said cylinder, plungers of equal area connected with opposite faces of said piston and extending out opposite ends of said cylinder, one of said plungers being connected with said blank holder, passage means through said piston, a valve member controlling said passage means and normally positioned to provide free passage for fluid through said piston, channel means extending through the other of said plungers, means responsive to a supply of pressure to said channel means for moving said valve member into position to interrupt said passage means, and to connect said channel means with the face of said piston adjacent the said one plunger, a valve normally exhausting said channel means, a supply of fluid under pressure, and means operable automatically by movement of the blank holder into its working position for actuating said valve to connect said channel means with said source of pressure.

6. In combination in a press having a reciprocal main platen and a blank holder platen suspended from the main platen; actuating means for said blank holder platen comprising piston means connected therewith and having equal areas on opposite sides, cylinder means in which said piston means reciprocate, channel means normally affording free communication between opposite ends of said cylinder means, a source of fluid under pressure, means responsive to a predetermined advancing movement of said main platen sufficient to carry said blank holder platen into its working position for interrupting said channel means and for instead connecting said source of fluid pressure with one side of said piston means, and said means also being responsive to a predetermined retracting movement of said main platen after completion of its working stroke and before it picks up said blank holder platen for again establishing said channel means.

WALTER ERNST.

References Cited in the file of this patent

UNITED STATES PATENTS

| Number | Name | Date |
|---|---|---|
| 701,755 | Morris | June 3, 1902 |
| 870,154 | Barker | Nov. 5, 1907 |
| 1,205,684 | Tothill | Nov. 21, 1916 |
| 1,562,988 | Nelson | Nov. 24, 1925 |
| 1,602,411 | Rode | Oct. 12, 1926 |
| 1,606,141 | Brown | Nov. 9, 1926 |
| 1,664,485 | Rode | Apr. 3, 1928 |
| 1,706,073 | Rode | Mar. 19, 1929 |
| 1,745,549 | Marghitan | Feb. 4, 1930 |
| 1,884,700 | Hothersall | Oct. 25, 1932 |
| 1,861,337 | Ernst | May 31, 1932 |
| 1,868,637 | Kuhner | July 26, 1932 |
| 2,040,731 | Ernst | May 12, 1936 |
| 2,046,762 | Applegarth | July 7, 1936 |
| 2,110,313 | Warrick | Mar. 8, 1938 |
| 2,113,110 | Ernst | Apr. 5, 1938 |
| 2,130,023 | Owen | Sept. 13, 1938 |
| 2,166,319 | Pocock | July 18, 1939 |
| 2,167,941 | Ernst | Aug. 1, 1939 |
| 2,217,172 | Laussucq | Oct. 8, 1940 |
| 2,246,940 | Hood | June 24, 1941 |
| 2,290,743 | Ernst | July 21, 1942 |
| 2,301,788 | Patton | Nov. 10, 1942 |
| 2,306,716 | Albers | Dec. 29, 1942 |
| 2,357,019 | Nowak | Aug. 29, 1944 |
| 2,382,878 | Holecek | Aug. 14, 1945 |
| 2,384,160 | Ernst | Sept. 4, 1945 |
| 2,390,359 | Ernst | Dec. 4, 1945 |
| 2,407,629 | Courtenay | Sept. 17, 1946 |
| 2,424,233 | Greenough | July 22, 1947 |
| 2,478,102 | Hull | Aug. 2, 1949 |